Feb. 3, 1970     J. O. McDONALD     3,492,705

APPARATUS FOR SPREADING TUBULAR NETTING

Filed July 1, 1968     3 Sheets-Sheet 1

INVENTOR.
JOHN O. McDONALD
BY

INVENTOR
JOHN O. McDONALD

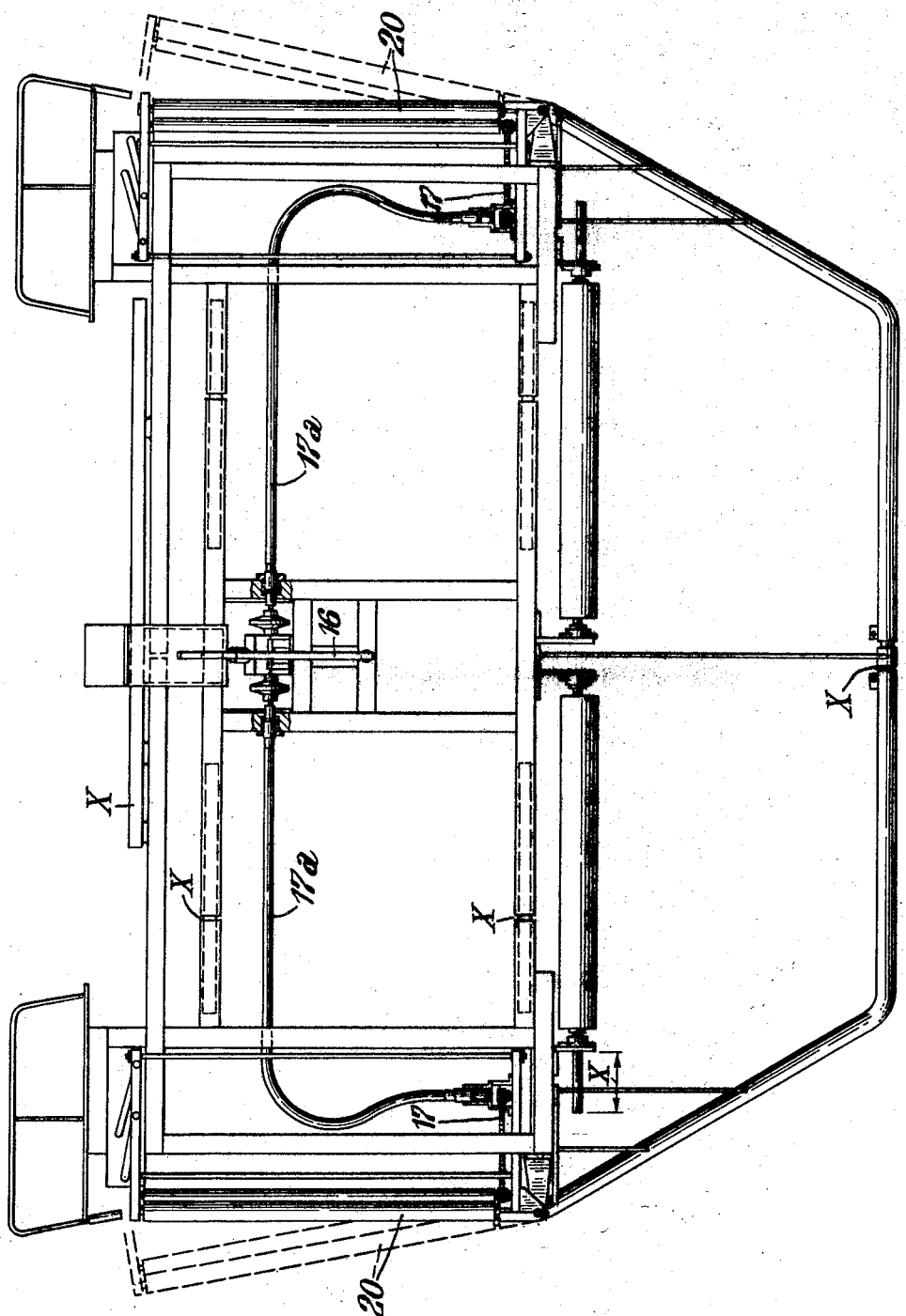

United States Patent Office 3,492,705
Patented Feb. 3, 1970

3,492,705
APPARATUS FOR SPREADING TUBULAR NETTING
John O. McDonald, Englishtown, N.J., assignor to Union Carbide Corporation, a corporation of New York
Continuation-in-part of application Ser. No. 604,437, Dec. 23, 1966. This application July 1, 1968, Ser. No. 741,412
Int. Cl. D06c *5/00, 3/00;* B29d *23/04*
U.S. Cl. 26—55                                8 Claims

ABSTRACT OF THE DISCLOSURE

A pair of rotatable orienting means, such as rollers, are mounted on a mandrel for spreading tubular netting, such as plastic net, to lay-flat form for wind-up. The rollers are axially aligned with the direction of passage of the tubular netting over the mandrel and are rotated in contact with the tubular netting to counteract its tendency to axially rotate and twist as it passes thereover.

---

Figure 1:
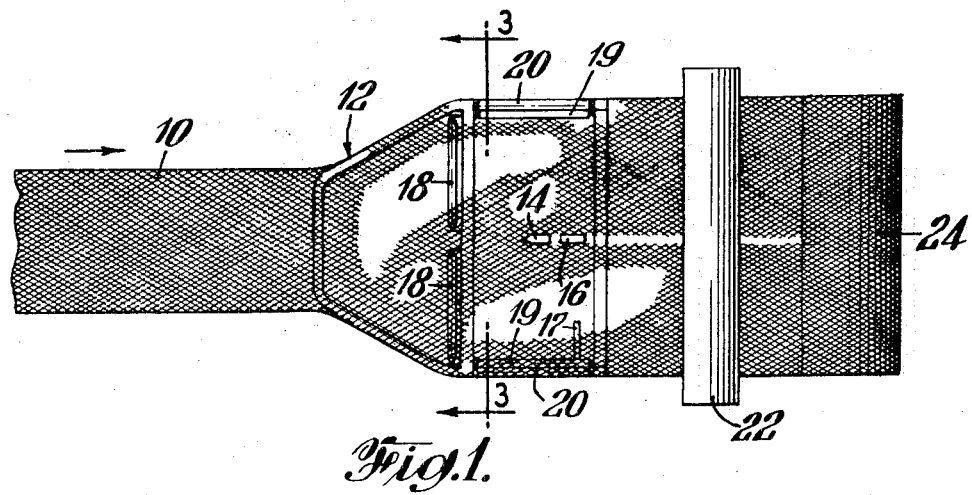

This application is a continuation-in-part of application Ser. No. 604,437, filed Dec. 23, 1966, and now abandoned.

This invention relates to an apparatus for spreading tubular netting and more particularly to spreading tubular plastic webs and tubular plastic netting.

Netting is frequently produced in tubular form. Plastic netting, for example, is comonly extruded in tubular form from tubular dies such as disclosed in U.S. Patent 2,919,467 to Mercer.

Such tubular netting often requires a mandrel to shape or spread it to a desired form including lay-flat form for even wind-up on a cylinder. The mandrel can take many forms, from the contained and captive types which are supported within the tube to those mandrels directly supported outside of the tube. The contained mandrel is supported by being mounted directly to a tube extruder and the tube is extruded around it. The captive mandrel is held indirectly within a tubular netting by support means mounted without, such as rolls, and the netting is passed over and around the mandrel and between mandrel and support means. The mandrel supported directly outside the tube has a support means mounted behind a slitter blade and the tube passes over the mandrel, is spread, slit and diverges around the support means.

When tubular netting passes over mandrels such as outlined above, including rounded mandrels and particularly flat mandrels, the tube tends to turn slowly on its longitudinal axis. This tendency to turn on the mandrel is brought about because of the tendency of the webs of the netting to adhere to the mandrel while it passes over it at an angle. Such turning causes the tube to twist between the source of the netting and the mandrel considerably hindering the process. For example, in producing lay-flat netting by passing tubular netting from an extruder to nip rolls in a quench bath, then to a flat mandrel and thence to wind-up there develops an axial turning of the tubular netting as it passes onto the mandrel from the nip rolls which builds up to a severe twist between nip rolls and mandrel. If unattended, the twist builds up to such an extent that the tightly twisted tube will not longer pass over the mandrel, blocking the process. To avoid such a blockage as well as a twisted and distorted product, the netting must frequently be cut between the nip rolls and the mandrel, untwisted and rethreaded on the mandrel and wind-up means. The winding process thus requires constant attention and a roll of net segments results rather than a continuous roll of netting which latter roll is highly desirable for subsequent continuous applications.

This invention provides an apparatus for spreading tubular netting which substantially prevents axial turning of the tube as it is being spread.

The present invention provides an apparatus for spreading tubular netting comprising a mandrel and means for passing the tubular netting longitudinally over and around the mandrel from a forward end to a trailing end thereof, the improvement comprising providing at least one rotatable orienting means mounted on the mandrel and defining a portion of the lateral periphery thereof, the orienting means being axially positioned in substantial alignment with a line drawn between the forward and trailing ends and thus with the direction of passage of the tubular netting thereover, and means for axially rotating the orienting means in either direction to counter the tendency of the netting to twist as it passes over the mandrel.

Figure 2:
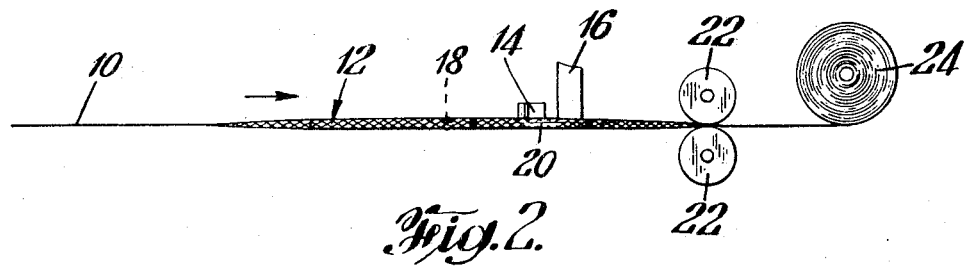
Figure 3:
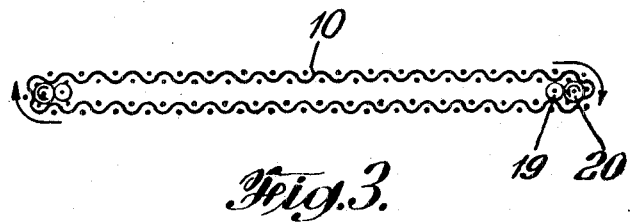
Figure 4:
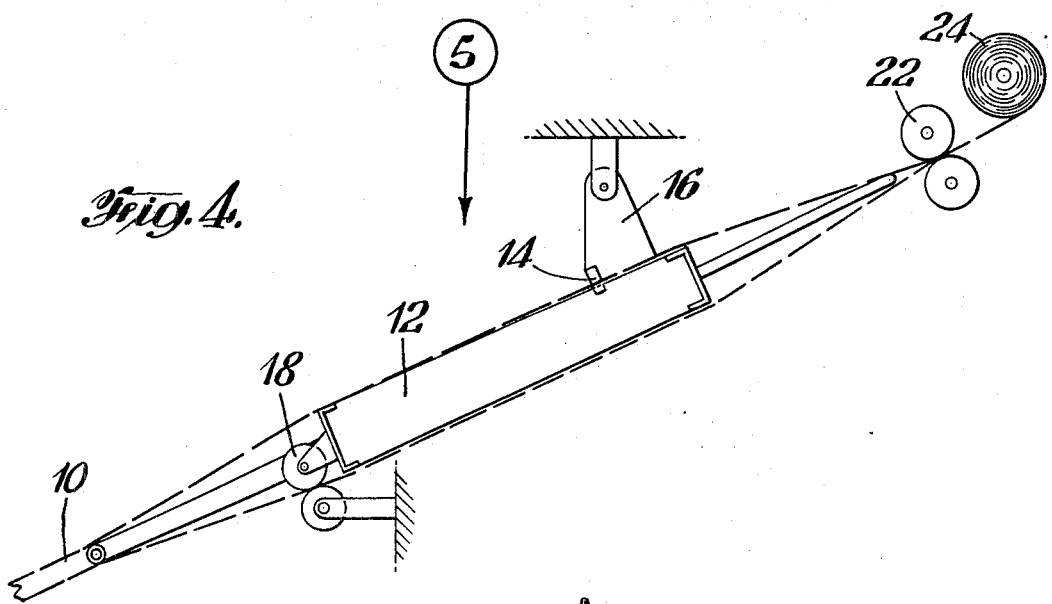
Figure 6:
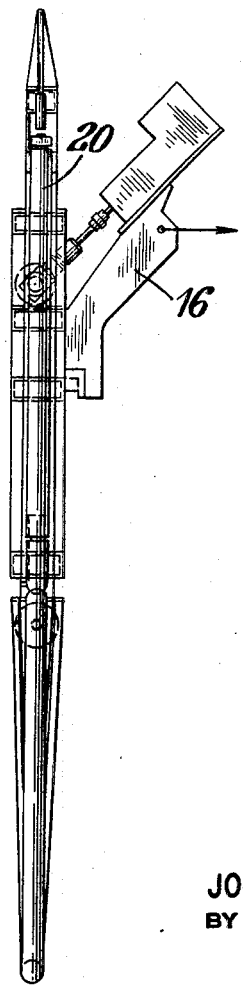

The invention will become more apparent from the following detailed specification and drawings in which:

FIG. 1 is a plan view of an apparatus embodying the invention for spreading tubular net;
FIG. 2 is a side view of the embodiment of FIG. 1;
FIG. 3 is a sectional elevational view of the apparatus taken on line 3—3 of FIG. 1;
FIG. 4 is a schematic sectional view of the apparatus of the invention, showing in elevation, the manner in which the mandrel assembly is supported;
FIG. 5 is a plan view of the apparatus of FIG. 4, showing details of the driving means for the alignment rollers of the invention; and
FIG. 6 is a side view of the mandrel assembly of FIG. 4.

Referring now to the drawings, the tubular netting 10 is drawn over the mandrel assembly 12 by nip rolls 22 to wind-up roll 24 as shown in FIGS. 1 and 2. Internal idler rolls 18 assist the passage of netting over the mandrel 12, and support the mandrel assembly. While passing over the mandrel 12, the netting 10 is slit by blade 14 and diverges around support bar 16 which supports the mandrel to the support structure above. The tendency of the netting 10 to axially rotate as it passes over the mandrel 12 is compensated for by driven rolls 20 which are rotated counter to the direction of the above rotational tendency and at a speed sufficient to prevent virtually any axial rotation of the passing netting. The rolls 20 are rotated by drive rolls 19, which are each connected through geared belts 17 to flexible drive shafts 17a. The drive shafts extend through the slit portion of the netting behind the blade 14 and support bar 16 through gearing means to a drive motor (not shown) on the upper support structure outside the netting. The spread and slit netting 10 upon emerging from the mandrel 12, is flattened by nip rolls 22 and collected on wind-up roll 24. Support bar 16, nip rolls 22 and wind-up roll 24 can be mounted in any conventional manner, for example, to a common frame (not shown).

The present invention provides for the spreading and recovery of tubular netting in an untwisted and unwrinkled state. Where the tube is passed from mandrel directly to wind-up a continuous-untwisted roll of netting can readily be obtained.

The mandrel employed can be mounted in any manner i.e. it can be mounted directly to a support without the tube as indicated in FIGS. 1 and 2. The mandrel can also be mounted wholly within the tube supported, for example, by rolls outside of the tube or mounted directly to an extruder. The main requirement of the mandrel is that it have at least one rotatable orienting means mounted thereon in substantially axial alignment with the direction of passage of the tubular netting over the mandrel (longitudinal axis of the mandrel) i.e. within an angle sufficient to counter the tendency of the tube to orient or axially rotate on the mandrel, e.g. within about 55° of that direction and preferably within 45° of the longitudinal axis of the mandrel.

The mandrel may take any conventional shape, such as spherical, cylindrical, and the like. And it may be partially or wholly flat. Where it is desired to spread the tubular netting to lay-flat form, the tube take-off portion of the mandrel is preferably flat. Otherwise, the mandrel may be wholly cylindrical or of any other non-flat shapes as warranted by process demands without departing from the scope of this invention.

Where a slitting means is associated with a mandrel it may be any conventional cutting device, for example, one or more knife blades, a hot wire or cutting wheels. Several blades can be employed where a netted product of several strips are desired. There can be more cutting devices than mandrel supports but each support preferably has a cutting device mounted before it.

The slitting means is preferably affixed to the mandrel but may be mounted to or be integral with the support means or a combination thereof. Moreover, the slitting means may be mounted outside of the mandrel and extend to the confines of the mandrel so as to slit the advancing netting. As used herein, "confines of the mandrel" includes the mandrel surfaces and any space encompassed thereby. For cooperation with the slitting means, a roll or other guide may be placed before the blade, for example, to prevent the netting from riding up on the blade during slitting.

The mandrel of this invention should be of a size sufficient to spread the tubular netting. Thus, at least a portion of the mandrel defines a lateral periphery substantially equal to or greater than the circumference of the tubular netting to be treated. Where a spreader-slitter mandrel of the type illustrated in the embodiment of the drawings is employed, that lateral periphery portion is situated between the forward end of the mandrel and the slitting means. Moreover, the mandrel can be expandable widthwise by the provision of telescoping elements as indicated at points X in FIG. 5 of the drawings, to present different size lateral peripheries. For example, as shown in FIG. 5 roller assemblies 19 and 20 can be moved laterally outward or pivoted outward from their upstream end on hinges or other conventional mechanical devices.

The roll or rolls can be situated at any location on the mandrel as long as the roll is mounted to firmly engage the passing tubular netting. Thus where the roll is mounted on a part of the mandrel that is small relative to the oncoming tube, the roll can be mounted in elevation at a distance from the mandrel part to firmly engage the tube. Where, however, the mandrel is provided with a slitting means, the roll is preferably mounted on the mandrel at least partially in advance of the slitting means to firmly engage the tube before it is slit.

The mandrel and mandrel roll or rolls can be made of any practical, relatively rigid, stable structural material such as metal including steel, wood, plastic and the like. Preferably the mandrel and mandrel roller are of metal.

The mandrel roll can have a smooth, grooved or generally rough surface as suitable for the material being spread. Generally a smooth roller surface is sufficient.

The mandrel roll or rolls are driven at the speed necessary to counteract the tendency of the tubular netting passing over the mandrel to axially turn. A speed of up to 25 r.p.m. is generally sufficient but greater rotation speed can be employed if needed.

The net take-off and collecting means may be any of those conventional in the art. A wind-up roll is suitable for pulling the netting over the mandrel and also for further flattening the netting under the tension of wind-up and where several strips of netting issue from the mandrel, one or more wind-up rolls can be used. However, nip rolls mounted between mandrel and wind-up rolls are preferable for flattening the netting as it issues from the mandrel, though not essential.

This invention is suitable for any tubular netting. By the term "netting" is meant any flexible material in net form, including fibrous and non-fibrous, woven and unwoven natural and synthetic materials, such as a netting of synthetic plastic fibers.

Moreover, the mandrel assembly of this invention may be adapted to a number of processes for treating tubular netting including hot stretching, setting, and slitting thermoplastic netting and orienting and slitting previously set netting.

What is claimed is:

1. In an apparatus for spreading tubular netting comprising a stationary mandrel and means for passing the tubular netting longitudinally over and around said mandrel from a forward end to a trailing end thereof, the improvement comprising rotatable orienting means mounted on said mandrel and defining a portion of the lateral periphery thereof which is at least substantially equal to the inner circumference of the oncoming tubular netting, said rotatable orienting means having at least one stationary axis positioned in substantial alignment with a line drawn between said forward and trailing ends and thus with the direction of passage of said tubular netting thereover and means for axially rotating said rotatable orienting means in either direction, to counter the tendency of the tubular netting to axially rotate and twist as it passes over said mandrel.

2. The apparatus of claim 1, wherein said lateral periphery is greater than the inner circumference of said tubular netting.

3. The apparatus of claim 1, wherein said rotatable orienting means is axially positioned within 45° of the longitudinal axis of said mandrel.

4. The apparatus of claim 1 additionally having a slitter blade mounted in close proximity with the mandrel so as to slit the oncoming netting and support means connected to said mandrel behind said blade.

5. The apparatus of claim 1, having a plurality of said rotatable orienting means.

6. The apparatus of claim 1, wherein said mandrel defines a flat lateral periphery at its widest portion and has means for providing an adjustable width.

7. The apparatus of claim 1, wherein the mandrel is constructed of tubing and is substantially flat from end-to-end.

8. The apparatus of claim 1, wherein said mandrel defines a flat lateral periphery at its widest portion and a pair of said rotatable orienting means are mounted on said mandrel at laterally opposed sides thereof.

References Cited

UNITED STATES PATENTS

| | | | |
|---|---|---|---|
| 2,652,615 | 9/1953 | Lasley | 26—55 |
| 2,767,427 | 10/1956 | Covington et al. | 26—55 XR |
| 3,090,991 | 5/1963 | Hathaway. | |
| 3,296,343 | 1/1967 | Buttolph et al. | |
| 3,305,615 | 2/1967 | McGregor. | |
| 3,370,116 | 2/1968 | Wrede | 18—1 XR |

ROBERT R. MACKEY, Primary Examiner

U.S. Cl. X.R.

18—1, 14